(12) United States Patent
Delaruelle et al.

(10) Patent No.: US 12,438,601 B2
(45) Date of Patent: *Oct. 7, 2025

(54) LOGON PROCEDURE PROVIDE A LOGON SIGNAL

(71) Applicant: ST Engineering iDirect (Europe) Cy NV, Sint-Niklaas (BE)

(72) Inventors: Daniel Delaruelle, Sint-Niklaas (BE); Philippe Delbeke, Wilrijk (BE)

(73) Assignee: ST Engineering iDirect (Europe) Cy NV, Sint-Niklaas (BE)

( * ) Notice: Subject to any disclaimer, the term of this patent is extended or adjusted under 35 U.S.C. 154(b) by 518 days.

This patent is subject to a terminal disclaimer.

(21) Appl. No.: 17/893,870

(22) Filed: Aug. 23, 2022

(65) Prior Publication Data
US 2022/0407589 A1    Dec. 22, 2022

Related U.S. Application Data

(63) Continuation-in-part of application No. 17/038,042, filed on Sep. 30, 2020, now Pat. No. 11,456,801.

(Continued)

(51) Int. Cl.
H04B 7/185    (2006.01)
H04W 76/10    (2018.01)

(52) U.S. Cl.
CPC ..... H04B 7/18513 (2013.01); H04B 7/18539 (2013.01); H04W 76/10 (2018.02)

(58) Field of Classification Search
CPC .. H04B 7/18558; H04B 17/104; H04B 17/13; H04B 17/364; H04B 7/1851; H04B 7/185; H04B 7/18589; H04L 67/00; H04W 8/00
See application file for complete search history.

(56) References Cited

U.S. PATENT DOCUMENTS

| 2003/0072252 A1* | 4/2003 | Gurney | H04W 72/02 370/252 |
| 2003/0072445 A1* | 4/2003 | Kuhlman | H04L 1/0001 380/42 |

(Continued)

FOREIGN PATENT DOCUMENTS

| WO | WO-2018092132 A1 * | 5/2018 | ......... H04B 7/18582 |
| WO | WO-2020031155 A1 * | 2/2020 | ........... H04B 7/2125 |

OTHER PUBLICATIONS

RCS2 updates discussion, DVB, digital video broadcasting, C/O EBU-17A Switzerland, Mar. 21, 2018 (Year: 2018).*

(Continued)

*Primary Examiner* — Mewale A Ambaye
(74) *Attorney, Agent, or Firm* — Workman Nydegger

(57) ABSTRACT

A method for a logon procedure in a 5GNR non-terrestrial network is provided, which includes at least one user equipment, a satellite and either a gNodeB base station or a gNodeB base station on-board the satellite or a gateway. The method includes transmitting a logon burst signal from a user equipment of the satellite communication system to the gNodeB base station or gNodeB base station on-board the satellite. The logon burst signal includes one or more transmit parameter fields, each transmit parameter field corresponding to a signal transmit time or a signal transmit level, or a signal transmit frequency of the logon burst signal in the user equipment.

20 Claims, 10 Drawing Sheets

Related U.S. Application Data

(60) Provisional application No. 62/907,980, filed on Sep. 30, 2019.

(56) References Cited

U.S. PATENT DOCUMENTS

| | | | |
|---|---|---|---|
| 2004/0179547 A1* | 9/2004 | Kuffner | H04L 1/0003 370/465 |
| 2010/0131268 A1* | 5/2010 | Moeller | G10L 21/0364 704/E15.039 |
| 2013/0157786 A1* | 6/2013 | Joseph | A63B 24/0075 473/436 |
| 2015/0238817 A1* | 8/2015 | Watterson | A63B 23/0476 482/8 |
| 2017/0103597 A1 | 4/2017 | Fisher | |
| 2017/0232298 A1 | 8/2017 | Joseph et al. | |

OTHER PUBLICATIONS

Pateros, "Novel Direct Sequence Spread Spectrum Multiple Access Technique," IEEE, at least as early as Dec. 31, 2000, pp. 564-568.

Skinnemoen, "Technology Proposal for the Next Generation DVB-RCS Covering Physical Layer, Data Link Layer and Signalling Solutions",STM Norway, May 4, 2009, 106 pages.

Del Rio Herrero et al., "High Efficiency Satellite Multiple Access Scheme for Machine-to-Machine Communications," IEEE Transactions on Aerospace and Electronic Systems, vol. 48, No. 4, Oct. 23, 2011, pp. 2961-2989.

Arnaud, "Digital Video Broadcasting (DVB); Second Generation DVB Interactive Satellite System (DVB-RCS2); Part 2: Lower Layers for Satellite Standard", ETSI EN 301 545-2 V1.22.1, Digital Video Broadcasting, EBU, Apr. 30, 2014, 242 pages.

Ahmed et al., "Software Defined Satellite Cloud RAN", International Journal of Satellite Communications and Networking, at least as early as Jan. 1, 2016, 46 pages.

De Gaudenzi et al., "Random Access Schemes for Satellite Networks, from VSAT to M2M: A Survey," International Journal of Satellite Communications and Networking, vol. 36, Dec. 15, 2016, pp. 66-107.

Mazzali et al., "Enhancing Mobile Services with DVB_S2X Superframing", International Journal of Satellite Communications and Networking, at least as early as Jan. 1, 2018, 35 pages.

DE BIE, "Update to RCS2 Specification", Shaping the Future of Satellite Communications, Mar. 22, 2018, 11 pages.

Extended Search Report from corresponding EP Application No. EP20199118, Feb. 19, 2021.

* cited by examiner

1: procedure GWAYINITIATED($\Lambda_{ini}, \Lambda_{min}, \Lambda_{max}, \delta_1, \delta_0, \gamma$)
2:     close occasional logon channel
3:     open massive logon channel
4:     $T_{tot} = L_{tot}/R_c$     ▷ logon burst duration
5:     $S \leftarrow$ set of previously active RCST $|S| = N_{pa}$
6:     optionally: order set $S$ using RCST info (RTT, SNR,...)
7:     $\Lambda \leftarrow \Lambda_{ini}$
8:     $N_1 \leftarrow 0$     ▷ counts logged on terminals
9:     $t_{TX} \leftarrow t_{NCR} + \epsilon$     ▷ first scheduled time
10:     while $N_1 < \gamma \cdot N_{pa}$ do
11:         if $t_{NCR} > t_{TX}$ then   ▷ (on gateway NCR clock)
12:             invite logon frm next RCST in S not yet logged on
13:             $t_{TX} \leftarrow t_{TX} + \Lambda^{-1} \cdot T_{tot}$
14:         end if
15:         if received valid logon burst then
16:             $N_1 \leftarrow N_1 + 1$
17:             $\Lambda \leftarrow min[\Lambda \cdot (1 + \delta_1), \Lambda_{max}]$
18:         end if
19:         if timeout logon invite then
20:             $\Lambda \leftarrow max[\Lambda \cdot (1 - \delta_0), \Lambda_{min}]$
21:         end if
22:     end while
23:     close massive logon channel
24:     open occasional logon channel
25: end procedure

Fig.9

1: procedure TERMINALINITIATED($\rho$)
2:     wait for forward link acquistion; from descriptor
3:     read $T_{max,acq}, T_{min,rtry}, T_{max,rtry}$
4:     $N_{TRIAL} \leftarrow 1$
5:     $\mu \leftarrow 1$
6:     $t_{TX} \leftarrow t_{NCR} + rand([0, T_{max,acq}])$
7:     while no ACK from gateway do
8:         read $t_{NCR}$
9:         if $t_{NCR} \geq t_{TX}$ then
10:             transmit logon burst
11:             $t_{TX} \leftarrow t_{TX} + rand([T_{min,rtry}, T_{max,rtry} \cdot \mu])$
12:             $N_{TRIAL} \leftarrow N_{TRIAL} + 1$
13:             $\mu \leftarrow N_{TRIAL}^{\rho}$
14:         end if
15:     end while
16: end procedure

Fig.13

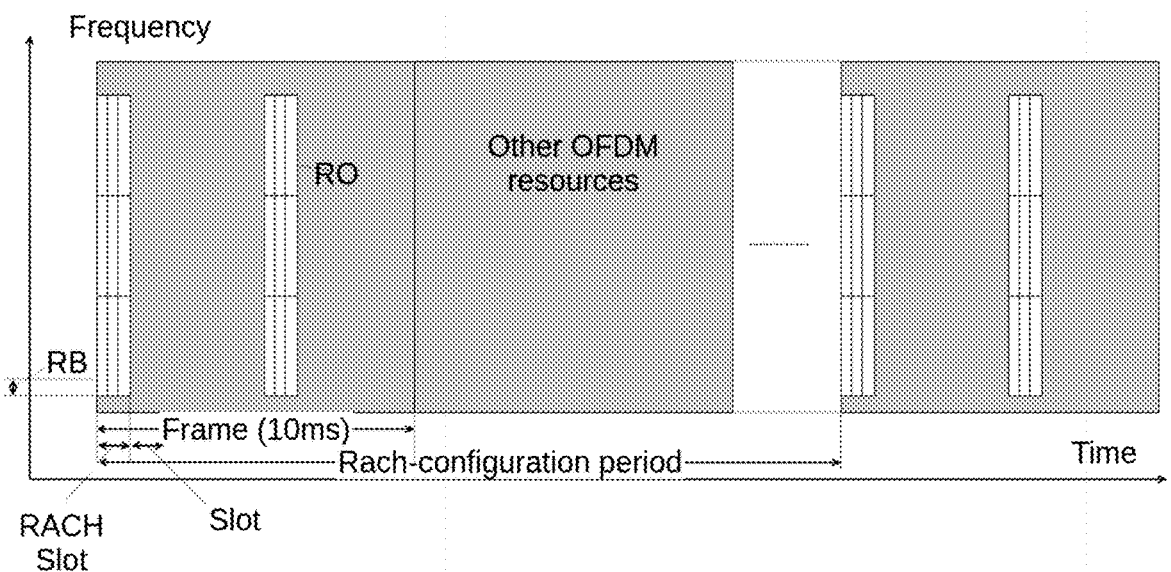

Fig.14

LOGON PROCEDURE PROVIDE A LOGON SIGNAL

FIELD OF THE INVENTION

The present invention is generally related to the field of satellite communication systems.

BACKGROUND OF THE INVENTION

Satellite communication standard DVB-RCS2 provides an interaction channel for satellite distribution systems. A typical DVB-RCS2 Network utilises a satellite with multi-beam or single beam coverage. In most networks the satellite carrying the forward link signal also supports the return link. The forward link carries signalling from the Network Control Centre (NCC) and user traffic to satellite terminals (RCSTs). The signalling from the NCC to RCSTs required to operate the return link system is called "Forward Link Signalling". A Network Management Centre (NMC) provides overall management of the system elements and manages the Service Level Agreement (SLA) assigned to each RCST.

In DVB-RCS2 the network control centre (NCC) may assign dedicated access (DA) or random access (RA) resources for sending logon messages from the RCSTs to the network control centre. Both DA and RA approaches are slotted, meaning they use a return link structure having disjunct timeslots. RCSTs then apply side information to compensate for satellite terminal distance variation and land a burst within a timeslot. Alternatively, timeslots may be oversized to absorb distance variation, but this is inefficient.

The DVB-RCS2 standard, in its long evolution since the 1996 introduction of a legacy standard, has never provided for a non-slotted approach to organizing logon transmissions. Consequently, it also does not provide for signalling of configurable attributes of non-slotted logon transmissions to the terminal.

A similar slotted mechanism exists in 5GNR, albeit with use of a different terminology. In 5GNR, the gNodeB (NCC) can allocate contention free random access (CFRA) resources or contention based random access (CBRA) resources for logon. Those allocations correspond to DA and RA, respectively. In 5GNR, currently no non-slotted logon option is available. In terrestrial communications this is not a big concern, as the delay uncertainty is typically not larger than 100 us and having a logon slot coping with this uncertainty is possible. However, with the emergence of non-terrestrial network (NTN) links and the associated higher link delay uncertainties, the current slotted logon mechanisms in 5GNR have similar drawbacks as their DVB-RCS2 counterpart. Furthermore, in 5GNR, unlike DVB-RCS2, a logon currently requires sending multiple transmissions from the user equipment (UE), thereby further amplifying the drawback.

The option of DA logon was not in a legacy DVB-RCS2 standard and aims to sidestep the drawbacks usually associated with RA: variable latency and risk of runaway contention, both a result of collision and re-transmission events. DA logon is not suited for occasional logon of terminals awaking from an idle state or roaming into a network impromptu: the NCC cannot assign DA slots impromptu. DA is applicable in case of re-logon of a large known set of terminals, but this requires deciding on the logon SNR of each terminal and building and signalling a corresponding temporary slot structure; alternatively, a rigid predetermined but less efficient slot structure can be used.

RA may apply not only to logon but also to user traffic (optionally in the DVB-RCS2 standard) and most recent developments in RA have focused on data transmission, where performance is naturally expressed in terms of throughput and packet loss ratio (PLR). A comprehensive survey of the long development of RA, its literature and applications are given in "*Random Access Schemes for Satellite Networks: from VSAT to M2M—A Survey*" (R. De Gaudenzi et al., IJSCN, Vol. 36, December 2016), covering milestones such as the Contention Resolution Dynamic Slotted Aloha (CRDSA) technique (an option in the DVB-RCS2 standard). CRDSA aims to overcome Packet Loss Ratio floors and throughput limitations of basic Slotted Aloha (SA) by sending multiple replicas of the message containing mutual pointers and then, in the receiver, iterate between burst detection and replica removal.

In early SA literature RA performance was analysed assuming that colliding transmissions are mutually lethal. This was then refined by taking into account the so-called capture effect, a term borrowed from FM radio: the stronger of two signals survives when its power divided by the sum of the weaker contender power and noise power is above a threshold. The stronger signal thus "captures" the receiver. Also, modern variants of SA, such as CRDSA, have been analysed under both hypotheses. Due to their antenna characteristics or lack of pointing accuracy, mobile terminals are often required to operate under Very Low Signal-to-Noise Ratio (VLSNR) conditions, and this requirement extends to the logon phase. Then, when anyway a VLSNR scheme is used, "capturing" becomes a misnomer since more than one of several colliding bursts can experience adequate Signal-to-Noise-plus-Interference Ratio (SNIR) for detection. Needless to say, receivers have to be purpose-built to handle overlapping transmissions: mere VLSNR support, say per standard, is not enough.

Information theory learns that VLSNR schemes are enabled by very low error-correction code rates where in the low SNR limit (say below −4 dB) simple symbol repetition coding or symbol spreading are nearly optimal. Therefore, VLSNR schemes comprise of a proper encoding stage followed by symbol repetition coding or symbol spreading. A symbol spreading sequence can be used alternatively for providing for multi-user access. In the Spread Spectrum Aloha (SSA) scheme disclosed e.g., in "*Novel direct sequence spread spectrum multiple access technique*" (C. Pateros, Proc. MILCOM 2000, 21st Century Military Communications Conf. Proc., Vol. 2, pp. 564-568, Los Angeles, Oct. 22-25, 2000), the spreading sequence is therefore user-dependent. In SSA transmissions are asynchronous (also non-slotted) and endowed with a spreading code for multi-user access.

The benefits of SSA are however preserved for a single spreading code as long as burst arrivals are not fully aligned. In "*High Efficiency Satellite Multiple Access Scheme for Machine-to-Machine Communications*" (O. del Rio Herrero et al., IEEE Trans. on Aerospace and Electronic Systems, Vol. 48, No. 4, pp. 2961-2989, October 2012) an improved detector for SSA signals is presented, adding iterative successive interference cancellation. This technique is called enhanced SSA (E-SSA). User signal power imbalance is generally considered SSA's Achilles' heel and E-SSA processing is touted as the remedy. In the special context of VLSNR logon this characterization is adjusted.

An SSA physical layer is also proposed in the ETSI S-MIM Technical Specification. ETSI S-MIM supports asynchronous, non-slotted transmission and synchronous, non-slotted transmission (non-slotted multi-user synchronous CDMA is used). ETSI-SMIM thus does not provide for the reception of an asynchronous non-slotted logon burst signal to assist in subsequent immediate alignment of transmissions in a slotted frequency resource.

Fast terminal logon in large mobile satellite networks faces challenges such as frequency translation errors, Doppler, very low SNIR, RF impairments, lack of initial synchronization, and lack of initial path gain knowledge combined with satellite operator restrictions on uplink spectral power flux density. There may also be a highly variable number of terminals simultaneously seeking access to a network gateway (simply due to different sizing of deployed networks, due to mobile terminals roaming between subnetworks while performing occasional logon, or also due to a possibly steep decrease in the number of terminals not yet successfully logged on in the massive logon regime). Also, some terminals, in particular mobile terminals, may locally overrule or modify predetermined or signalled return link signal parameters, such as transmit level or transmit frequency, thereby creating uncertainty in the gateway or gateway proxy about the transmit levels effectively configured in the return link transmitter. This variability and uncertainty call for robust logon procedures that use resources efficiently yet adapt to unknown conditions. It also calls for flexible configuration of non-slotted RA logon channels, which is not provided in available standards.

Hence, there is a need to address the drawbacks of slotted RA and DA logon as described above. Stated in 5GNR terminology, there is a need to address drawbacks of CBRA and CFRA slotted logon in 5GNR based non-terrestrial networks (NTN). There is also a need to avoid or reduce complex iterative processing in the receiver, as in CRDSA or E-SSA, as described above.

SUMMARY OF THE INVENTION

It is an object of embodiments of the present invention to provide for a return link logon signal and a corresponding signalling method that addresses the above-mentioned challenges and requirements.

The above objective is accomplished by the solution according to the present invention.

In a first aspect the invention relates to a method for a logon procedure in a satellite communication system comprising at least one terminal, a satellite and either a gateway proxy on-board the satellite or a gateway. The method comprises transmitting a logon burst signal from a terminal of the satellite communication system to the gateway proxy on-board the satellite or the gateway, whereby the logon burst signal comprises one or more transmit parameter fields, each transmit parameter field corresponding to a signal transmit time or a signal transmit level, or a signal transmit frequency of the logon burst signal in the terminal.

The proposed solution allows for a logon procedure, initiated by either the gateway proxy or the gateway, or otherwise by a terminal of the satellite communication system, wherein the one or more parameters in the one or more transmit parameter fields provide information that can be used for immediately characterizing a signal translation in the satellite channel. If a signal transmit time is conveyed in a transmit parameter field, immediate characterization of the satellite channel delay (and, hence, distance) can be performed upon burst arrival time measurement in the receiver device. If a signal transmit level is comprised in the transmit parameter field, immediate characterization of the satellite channel signal gain (or loss) is enabled upon burst arrival level measurement in the receiver device.

In a preferred embodiment the method comprises receiving the logon burst signal in the gateway proxy on-board the satellite or the gateway and retrieving the one or more transmit parameter fields, the method comprising:
- if a transmit parameter field of the one or more transmit parameter fields comprises a network clock reference time stamp value corresponding to a transmit time of the logon burst signal, measuring an arrival time of that logon burst signal and computing a path delay based on the measured arrival time and the network clock reference time stamp value,
- if a transmit parameter field of the one or more transmit parameter fields comprises a transmit level value corresponding to a transmit level of the logon burst signal, measuring an arrival level of the logon burst signal and computing a path gain based on the arrival level and the transmit level value,
- if a transmit parameter field of the one or more transmit parameter fields comprises a transmit frequency value corresponding to a transmit frequency of the logon burst signal, measuring an arrival frequency of the logon burst signal and computing a path frequency translation based on the arrival frequency and the transmit frequency value.

In an embodiment the method further comprises instructing the terminal to send at least a first subsequent signal, wherein a transmit time or a transmit level or a transmit frequency of the first subsequent signal is modified based on the computed path delay or path gain or path frequency translation, respectively.

In another embodiment of the gateway or terminal initiated logon procedure networks or subnetworks use logically distinct logon channels and entirely or partially reuse frequency with the intention to share logon resources between networks or subnetworks. The target (sub)network is identified by a field in the logon burst, for example by the unique logon channel id selected to be unique for (sub)networks. In an embodiment the logically distinct logon channels are uplinked in a physically shared wide return control beam and address subnetworks that send traffic in forward and return link over a different beam than the control beam used for logon.

In some advantageous embodiments the logon procedure is initiated by a gateway or gateway proxy and comprises a logon sequence which consecutively instructs, at a given sequencing pace, each individual member of a predetermined set of terminals (e.g. by sending an instruction packet to each terminal) to send a logon burst signal in a common logon channel shared by that predetermined set of terminals.

The order in which each terminal of the predetermined set is instructed in the logon procedure is advantageously determined based on information collected in the gateway or in the gateway proxy. The order may for example be determined based on a round-trip time (e.g., the terminal with the lowest RTT sends first) or on a logon signal-to-noise ratio (whereby e.g., the terminal with the highest SNR sends first).

In one embodiment the sequencing pace is modified based on a ratio of successful reception versus unsuccessful reception (timeout) of instructions of said logon sequence. In some embodiment that ratio is substantially equal to 1, meaning there is a substantially equal number of successful and of unsuccessful receptions (in other words, a packet loss ratio of 50%).

In a preferred embodiment the logon burst signal is transmitted via a non-slotted logon frequency resource shared among said one or more terminals.

Advantageously, the method further comprises performing non-logon signal transmissions via a slotted frequency resource, said slotted frequency resource being disjunct from the shared non-slotted frequency resource.

In another aspect the invention relates to a signal for use in a logon procedure for a satellite communication system comprising at least one terminal, a satellite and either a gateway proxy on-board the satellite or a gateway, wherein the signal is a logon burst signal comprising one or more transmit parameter fields, each transmit parameter field corresponding to a signal time or a signal level or a signal frequency of said logon burst signal.

In one embodiment the transmit parameter field corresponding to the signal time comprises a network clock reference time stamp field corresponding to the transmit time of the logon burst signal.

Advantageously the signal comprises a field to uniquely identify the intended receiving network or subnetwork in the satellite communication system of the logon burst signal.

In yet another aspect the invention discloses a method for organizing a return link in a satellite communication system. The satellite communication system comprises one or more terminals, a satellite and either a gateway proxy on-board the satellite or a gateway. The method comprises:
  assigning a non-slotted frequency resource for logon transmissions shared among said one or more terminals,
  assigning a slotted frequency resource for non-logon transmissions from the one or more terminals, said slotted frequency resource being disjunct from the shared non-slotted frequency resource.

In this way interference between logon transmissions and non-logon transmissions is avoided. Preferably, the frequency resource for slotted non-logon transmissions is accessed after initial synchronization based on logon transmissions.

The return link may be organized such that networks or subnetworks in the satellite communications system use logically distinct logon channels and entirely or partially reuse frequencies in the frequency resource assigned to logon transmissions. The logon procedure may be terminal initiated or gateway initiated. The intention is to share logon resources between networks or subnetworks. The target (sub)network can be identified by a field in the logon burst signal, for example the logon channel id selected to be unique for (sub)networks. Alternatively, the target (sub) network is for example identified by selection of a spreading sequence of the logon channel. In that case a receiver for a subnetwork would reject signals destined to other subnetworks upon despreading the signal according to the spreading sequence used in the subnetwork, even when sharing the frequency resource for logon transmissions.

The logically distinct logon channels may be uplinked in a physically shared wide return control beam and may address subnetworks that send traffic in forward and return link over a different beam than the control beam used for logon.

In some embodiments the shared non-slotted logon frequency resource is shared by mobile and non-mobile terminals and nominal transmit frequencies are slightly separated so as to have reduced random access (RA) interference.

In preferred embodiments a logon signal is used in the logon procedure as described previously. Such a logon signal is a burst signal comprising one or more transmit parameter fields, each transmit parameter field corresponding to a signal time or a signal level or a signal frequency of the logon burst signal.

The method for organizing may further comprise sending in a signalling channel from said gateway or gateway proxy to the terminals, a configuration description of one or more logon channels; receiving the signalling channel in the one or more terminals, extracting in each terminal one or more configuration descriptions of said one or more configuration descriptions sent; for each subsequent gateway-initiated or terminal-initiated transmission by the terminal of a logon burst signal, first selecting a logon channel (description) among said extracted logon channel descriptions; and finally modifying the logon burst signal transmitted according to the selected logon channel.

The one or more configuration descriptions sent in said signalling channel may comprise a logon channel id (that may be unique in some embodiments) that is echoed in the logon burst signal sent when performing logon according to said configuration description of said selected logon channel.

The one or more configuration descriptions sent in the signalling channel comprise a transmit frequency value corresponding to the transmit frequency of the logon burst signal sent when performing logon according to the configuration description of said selected logon channel.

In other embodiments the one or more configuration descriptions sent in the signalling channel comprises one or more waveform parameters modifying the baseband processing applied when performing logon according to the configuration description of the selected logon channel.

The baseband processing may comprise applying a spreading sequence. The configuration descriptions sent in the signalling channel then comprise a field specifying the spreading sequence applied when performing logon according to said configuration description of the selected logon channel. This offers the advantage that a same spreading sequence can be applied for terminals selecting a same logon channel.

In embodiments the configuration descriptions sent in said signalling channel comprise a field specifying whether terminals belonging to a predetermined terminal class (for example a mobility class) are allowed to select the logon channel for performing logon.

The configuration descriptions sent in the signalling channel may advantageously comprise a field specifying whether terminals are allowed to select the logon channel for performing logon terminal-initiated logon.

The configuration description further advantageously includes a field specifying a time interval during which terminals are not allowed to select the logon channel for performing terminal-initiated logon. This is meant to reserve the interval for gateway-initiated transmissions.

The solution presented in this invention is also beneficial for 5GNR Non-Terrestrial Networks (NTN) applications. In 5GNR terminology, the logon channel is named the Random Access Channel (RACH) and a logon slot is called a RACH occasion (RO).

In 5GNR, the link timing delay is estimated by measuring the offset of the received logon sequence in the reception slot. This works well for terrestrial communication where the uncertainties are limited. In case of higher uncertainties as observed on 5GNR NTN links, the reserved RO slot must be big enough to accommodate for the uncertainties yielding an inefficient solution. This problem is also identified in 5GNR NTN (Ref 3GPP TR 38.821). The current baseline in 5GNR is to use terminal and satellite position data to precompensate the logon delays at terminal side and guarantee that the RACH waveform arrives within the reserved RO slot. The position data can be obtained via GNSS data and requires a periodic broadcast of satellite navigation data in case of LEO profiles. Unfortunately, the GNSS data can be unreliable, slow to acquire, consume lots of battery power in case of IoT and make terminal more expensive. With the present invention the need of a GNSS receiver in the terminal is removed and the drawbacks are overcome.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

FIG. 9 illustrates a possible implementation of a gateway-initiated logon procedure (running in gateway).

FIG. 13 illustrates an embodiment of a terminal-initiated logon procedure.

FIG. 14 illustrates the reserved RACH resources in a 5GNR OFDM grid for typical terrestrial network.

DETAILED DESCRIPTION OF ILLUSTRATIVE EMBODIMENTS

Figure 1:
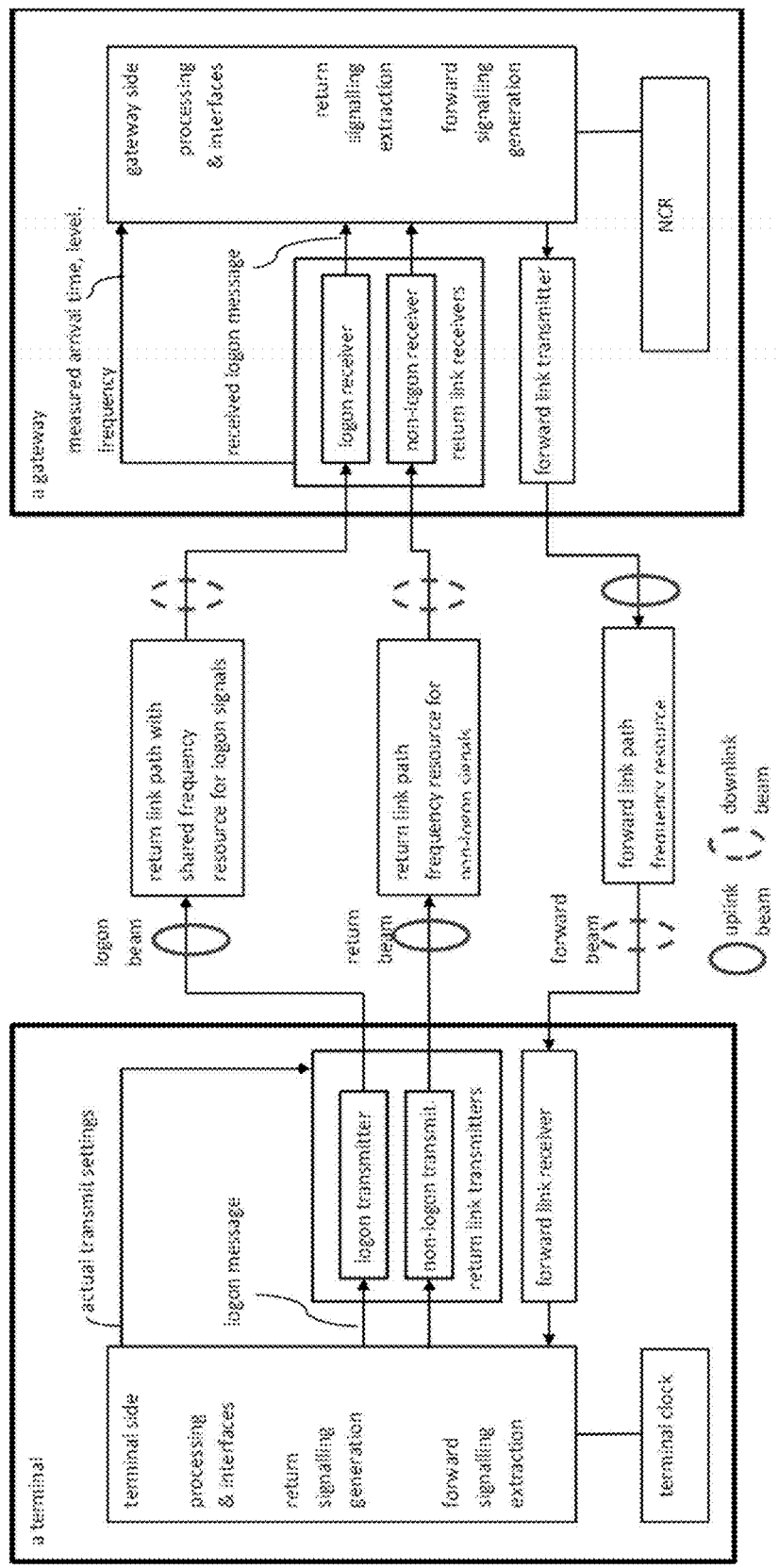
FIG. 1 illustrates a network in a satellite communication system according to embodiments of logon methods according the invention, showing elements in the terminal and gateway, and showing paths for signals, signalling and traffic, in the case of a non-regenerative satellite, with termination of satellite links to and from the terminals in a gateway.

The present invention will be described with respect to particular embodiments and with reference to certain drawings, but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Some terminology is first introduced for gateway/terminal roles and states related to satellite terminal logon, as used in this description.

- as gateway is denoted the possibly distributed entity in a satellite network that terminates satellite links to or from the terminals in the network and that typically also connects to a terrestrial data transport network; in a traditional bent-pipe satellite communications system the gateway is located entirely in the ground segment; in a regenerative satellite communications system the termination of satellite links to the terminals is devolved to a gateway proxy on-board a satellite and separate feeder links and possibly inter-orbit links (not discussed in this description) relay data between the gateway proxy and terrestrial data networks. The NCC functions of generating forward link signalling and processing return link signalling are represented as part of the gateway (or gateway proxy).
- the network clock reference (NCR) is a sampled reference clock distributed from the gateway to terminals
- a logon is gateway-initiated when the logon message from the terminal to the gateway is sent in response to a request from the gateway
- a logon is terminal-initiated when the logon message from the terminal to the gateway is uninvited
- a logon is gateway-timed when it is gateway-initiated, and the invite schedules the NCR time of the logon burst
- with respect to the forward link following terminal states can be distinguished:
  - acquisition: the terminal is (re)acquiring the forward link carrier and forward link signalling channel; it is then typically barred from sending any return signal (including logon messages)
  - acquired: the terminal has acquired the forward link carrier and forward link signalling channel
- with respect to the return link following terminal states can be distinguished:
  - active: the terminal is being assigned return traffic slots in response to capacity requests
  - idle: the terminal has not been requesting capacity for a time shorter than $T_{LOGOFF}$ and is given its allotted keep-alive return capacity
  - logged-off the terminal is denied return capacity until further notice
  - idle-logged-off logged-off state reached after no capacity request is received for at least a time $T_{LOGOFF}$
- an always-on policy for a network or terminal means having a $T_{LOGOFF}=\infty$
- in the occasional logon regime terminals perform logon for uncorrelated reasons such as return from idle-logged-off, being switched on
- in the massive logon regime terminals perform logon for heavily correlated reasons, such as jointly reaching forward acquired state after a common forward link interruption
- with respect to above definitions e.g., the following functions may be devolved to a gateway proxy on-board the satellite
  - the generation of the network clock reference (NCR)
  - the generation of the forward link signalling
  - the transmitter of the forward link signal
  - the receiver of logon signals sent by terminals in the return link
  - the receiver of other signals sent by terminals in the return link
  - initiating the gateway-initiated logon transmissions
- In particular "gateway-initiated" is therefore understood to mean initiated by a gateway in the ground segment or by a gateway proxy on-board the satellite.

In a 5GNR context the terminology is slightly adapted:

- The gateway is typically called the gNodeB. The gNodeB is a 5GNR base station organising the connection with all the terminals or UEs. The gNodeB can be located on the ground in case of bent-pipe satellite systems or onboard the satellite in case of regenerative satellite systems.
- The terminal is called a UE (user equipment).
- The UEs are synchronised to the system clock and timing information is expressed via the System Frame Number (SFN). The SFN is numbering the system frames of 10 ms and has a wraparound periodicity of approximately 10 seconds. For improved accuracy the SFN can be combined with a subframe counter allowing a marking of the timing with a 1 ms granularity.

Also the concept of satellite beams, as used in this description, is briefly clarified. Many satellite systems have multiple beams and exploit frequency reuse. A same RF frequency can be independently assigned in distinct beams with essentially orthogonal polarization or with spatial separation, as created by the satellite's radio frequency subsystem, often in conjunction with signal processing in analogue or digital beamforming circuits. When beam isolation is low and receivers are sensitive, signals destined for an adjacent beam can be unintentionally decoded in a receiver for another beam. For example, beams A and B have low isolation at the location of a transmitter X; X sends a signal to the receiver listening to beam B, but this signal is also picked up in the receiver listening to beam A (where A and B are typically adjacent). Some satellite systems have a wide beam for relaying control information before a selective beam is assigned for relaying traffic.

The present invention discloses a very low SNR (VL-SNR) SSA logon waveform suitable for use in high mobility networks with aeronautical terminals globally. In particular, regimes of occasional logon and massive logon are addressed. For occasional logon robust performance is shown under harsh Doppler and phase noise, down to very low logon signal bandwidth. For massive logon fast and reliable network recovery is shown, in particular under a novel adaptive gateway-coordinated logon schedule. This is achieved without resorting to E-SSA processing and for any power imbalance distribution.

Figure 2:
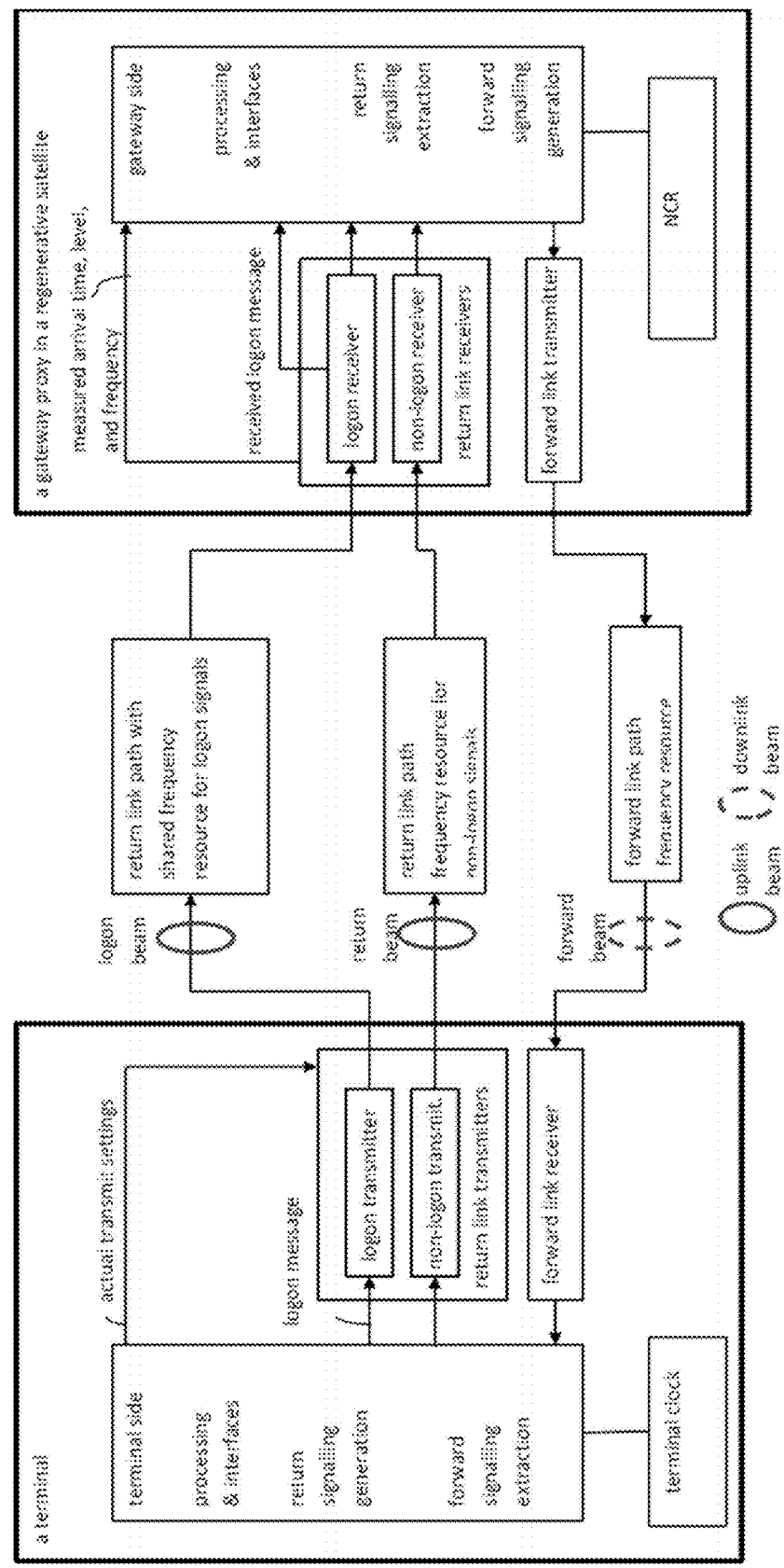
FIG. 2 illustrates a network in a satellite communication system according to embodiments of logon methods according the invention, showing elements in the terminal and gateway, and showing paths for signals, signalling and traffic, in the case of a regenerative satellite, with termination of satellite links to and from the terminals in a gateway proxy on-board a satellite.

FIG. 1 and FIG. 2 illustrate a network or subnetwork in a satellite communication system wherein embodiments are implemented of the logon method proposed in the present invention. The figures show functional elements in the terminal and gateway and paths for signals, signalling and traffic, in the case of a non-regenerative satellite and a regenerative satellite, respectively. In a non-regenerative satellite, satellite links to and from the terminals are terminated in a gateway. In a regenerative satellite, links to and from the terminals are terminated in a gateway proxy on-board a satellite. The separate feeder links and possibly inter-orbit links that relay data between the gateway proxy and a terrestrial gateway connected to a terrestrial data transport network are not shown.

In particular FIG. 1 and FIG. 2 show a gateway/gateway proxy and a terminal in the satellite communication system, various signals relayed between terminal and gateway, and the various transmitters and receivers for the signals. The signals carry signalling and traffic messages as follows. The forward link signals carry forward link traffic, general forward link signalling inclusive the NCR and forward link signalling specific to the logon functionality. The latter comprises signalling for logon configuration and control, either destined to a single terminal (unicast signalling), for example an invite to a single terminal to send a logon burst, and signalling to a population of terminals (broadcast signalling), for example a description of logon channels. The logon returns link burst signals carry logon return signalling. The non-logon returns link burst signals carry return link traffic and other return link signalling. The signals are relayed by means of a frequency resource (depicted by one of the frequency resource boxes). In the forward link path, there is a frequency resource. In the return link path, there is a frequency resource for the non-logon signals. Further there is in the return link path for the logon signals a frequency resource shared among the one or more terminals for a (sub)network. Furthermore, different (sub)networks each similar to the subnetwork depicted in FIG. 1 and FIG. 2 may have a same or overlapping frequency resource assigned to logon transmissions in order to completely or partially share a logon frequency resources among different (sub)networks. This sharing can be done in a non-slotted way (see also below). The frequency bandwidth resources are allocated in a satellite beam (depicted by a dotted ellipse encircling the signal arrow out of the frequency resource for a downlink beam and by a plain ellipse encircling the signal arrow into the frequency resource box for an uplink beam). Disjunct ellipses in FIG. 1 or FIG. 2 are not meant to symbolize non-overlapping beams. Likewise, in case of different (sub)network instances completely or partially sharing a logon frequency resource, the beams in which said shared frequency resources are allocated may overlap. For example, a frequency resource for logon signals might be assigned in a same beam as the frequency resource for other return link signals.

It will readily be appreciated that the embodiment with regenerative space segment in FIG. 2 is conceptually similar to the embodiment with non-regenerative space segment in FIG. 1. Some distinctions are however to be observed. In the regenerative case of FIG. 2, the frequency resource allocated to the logon return link is only allocated in an uplink beam, whereas in FIG. 1 it was allocated both in an uplink beam and a downlink beam. Similar observations hold, mutatis mutandis, for the frequency resources allocated to other return link signals and to the forward link signal. Consequently, the path delay and round-trip time are to be understood as follows. A signal path between terminal and gateway side is in FIG. 1 formed by the aggregation of an uplink and a downlink path section, whereas in FIG. 2 it corresponds to either an uplink section or a downlink section. Likewise, a round-trip time (RTT) in FIG. 1 aggregates the delay of two uplink sections and two downlink sections, whereas in FIG. 2 it aggregates one uplink section and one downlink section. It will further be clear to a person skilled in the art that in more general satellite system topologies, for example in mesh (terminal-to-terminal) topologies, some aspects of the present invention will carry over without changing the substance of the disclosed invention.

In FIG. 1 and FIG. 2, a first transmitter in the terminal sends logon bursts signals and a second transmitter sends subsequent non-logon return link signals. As is obvious to a person skilled in the art, these transmitters may be realized in some embodiments with a shared circuit, adapted to transmit logon signals and non-logon signals. In other embodiments they are implemented using separate circuits. Likewise, the number of return link transmitter functions shown in FIG. 1 or FIG. 2 is not intended to be limiting. Obviously, a terminal may host multiple return link transmitters, for example to support more than one return link channel.

In one aspect the invention relates to the inclusion in the logon burst signals of transmit parameter fields corresponding to a transmit time or level or frequency configured in the logon transmitter (by controlling the transmit circuits—see FIG. 1-2). Then, upon reception in the gateway (or gateway proxy) of the logon burst signal, based on an actual transmit parameter conveyed in the transmit parameter field and on the measured arrival time or level or frequency, it is possible to immediately compute a time or level or frequency translation in the logon signal path to the gateway. According to embodiments of the invention, the immediate characterization of the time, level or frequency translation in the satellite return link, is used for subsequently instructing the terminal to send subsequent non-logon transmissions with actual transmit parameters modified so as to achieve immediate time, level or frequency coordination in the return link. As will be elucidated further in this description by example, this solves the challenges of meeting regulatory requirements or immediate synchronization for return link transmissions.

The invention is however not limited to the abovementioned transmit parameter fields corresponding to a transmit time or level or frequency. For example, a terminal capable of adjusting transmit polarization may include a field containing the configured transmit polarization. The gateway or gateway proxy measures the receiver polarisation and thus estimates the polarisation error in the transmit antenna system (cross-polarization to co-polarization emission ratio). Subsequently terminals are instructed to send non-logon transmission with polarization configured so as to reduce unwanted cross-polar emissions. Further, a mobile terminal with electrically steerable antenna (ESA) may include a field with the precise configured antenna steering angle (configured with respect to mobile terminal reference axis). This may allow collecting statistics on antenna performance as a function of the steering angle or collecting statistics on the transmitter's reference axis attitude (assuming pointing was accurate).

Figure 3:
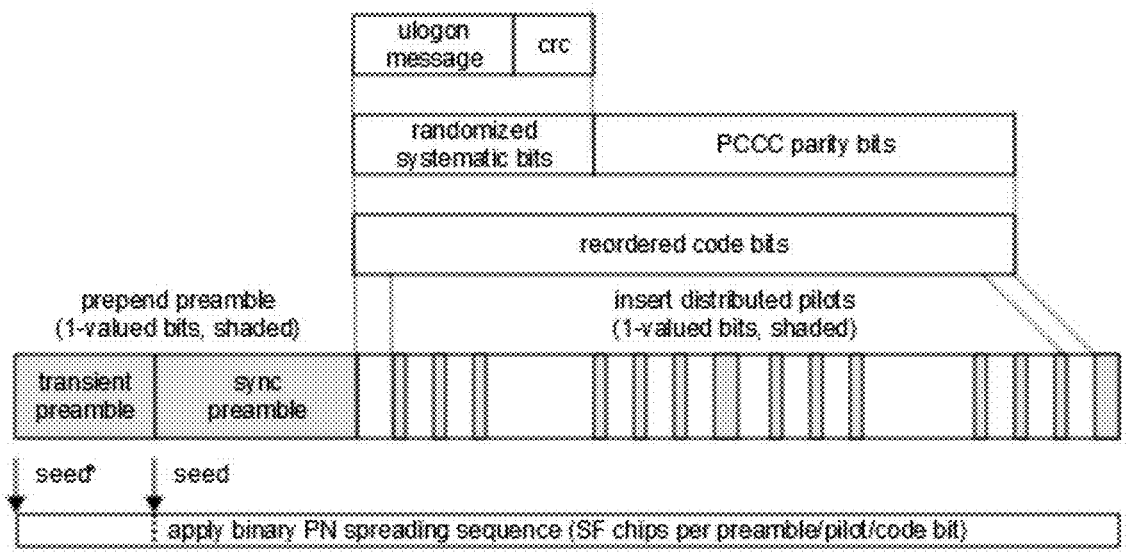
FIG. 3 illustrates the transmit side processing steps in generating the waveform of the logon signal for an embodiment of the method according to the invention.

FIG. 3 illustrates consecutive transmit (TX) side processing steps in a transmitter of a signal according to the invention for use in a terminal-initiated or gateway-initiated logon procedure. Note however that the order of the illustrated steps in FIG. 3 is only one possible option and that many alternatives are available, as the skilled person will readily understand. A 32-bit Cyclic Redundancy Check (CRC) encoding allows discarding false positive burst detections in the receiver with high confidence, leaving only true positives (in case of success) or missing bursts (timeout, in case of no success). Subsequent steps are randomization and forward error correction (FEC) encoding according to a Parallel Concatenated Convolutional turbo Code (PCCC). These steps also occur in the DVB-RCS2 standard. In DVB-RCS2 randomization is however performed before CRC encoding. Three types of known bits are inserted next. First, the sync preamble is used for candidate burst detection in the receiver. Second, an optional transient preamble is prepended. Third, pilots are inserted in-between (permutated) code bits. The known bits at this point have value 1 and take their final pattern after applying, to these known bits and code bits alike, a spreading sequence with spreading factor (SF), replacing each bit with SF chips. Next, $\pi/2$-BPSK mapping of the code bits results in a complex symbol sequence. Finally, standard baseband TX filtering with roll-off factor is applied, e.g., with a roll-off factor $\alpha$ equal to 0.05. A $\pi/2$-BPSK signal has reasonably constant envelope and can be generated, approximately, using binary Continuous Phase Modulation (CPM) of modulation index h=½. It is then still decodable, with slight degradation, in a receiver designed for linearly modulated $\pi/2$-BPSK. CPM is an optional transmit scheme in DVB-RCS2. Signalling of the configurable baseband waveform parameters, such as preamble length, spreading factor, chip rate (or symbol rate) is provided for, for example by sending such parameters in a configuration description for a logon channel. Signalling of RF frequency is also provided for.

Figure 4:
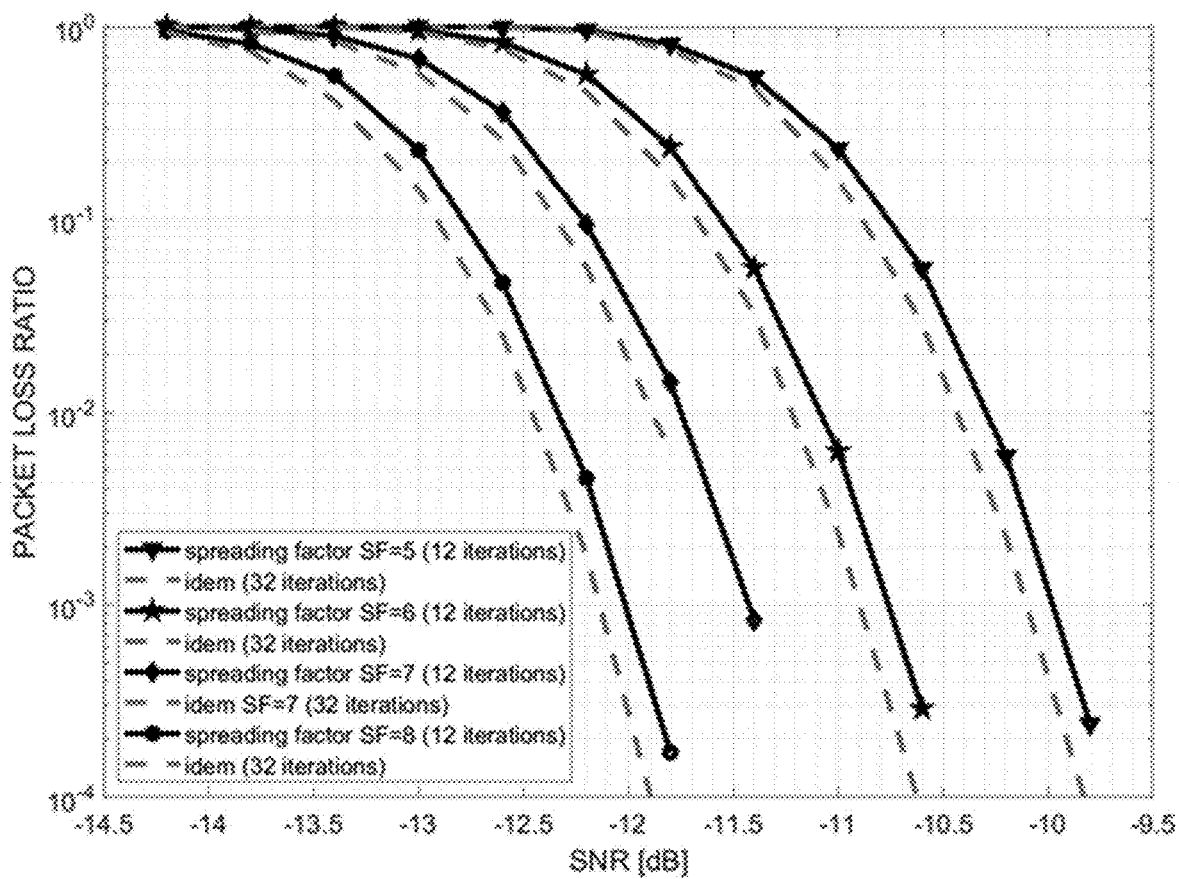
FIG. 4 illustrates the configurable logon waveform: pilot demodulation and decoder performance in AWGN channel. The chip rate equals 100 kChip/s. Spreading factors 5 to 8 are applied.
Figure 5:
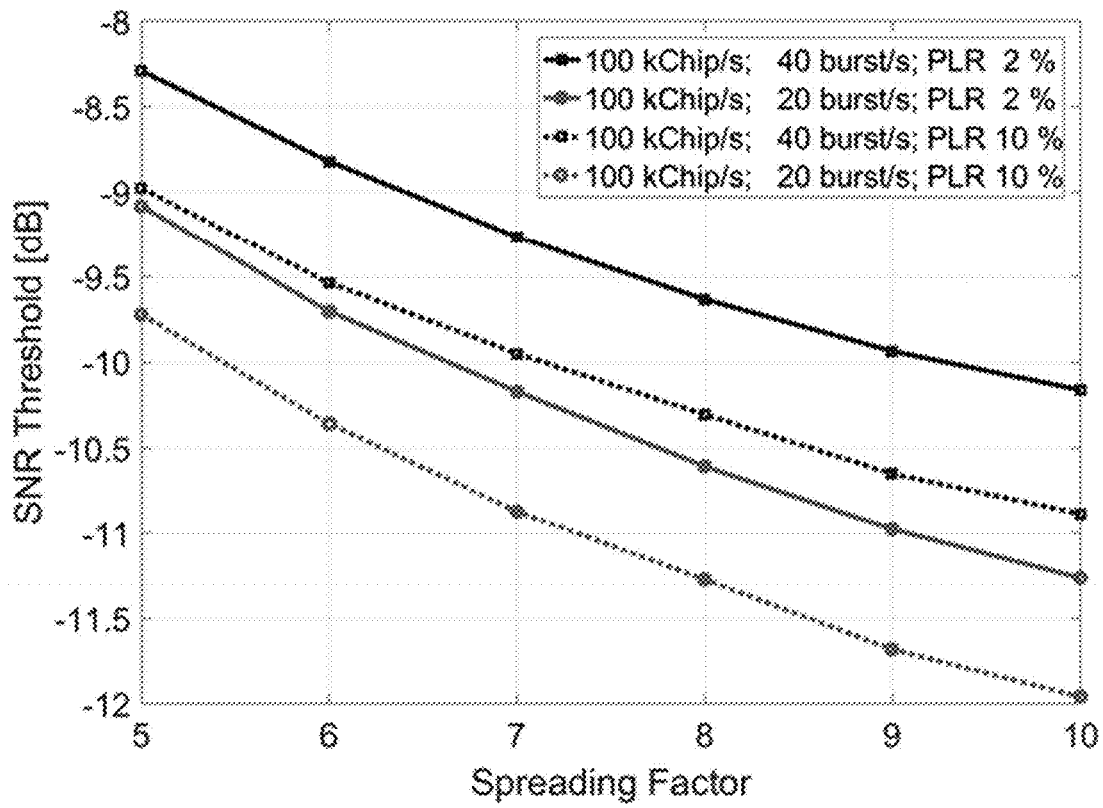
FIG. 5 illustrates the performance in the RA channel of the configurable logon waveform. The chip rate is 100 kChip/s. The spreading factor is varied under constant logon attempt rate.

The packet loss ratio of the scheme for an additive white Gaussian noise (AWGN) channel in the absence of RA interference is shown in FIG. 4, for various spreading factors, assuming given coarse synchronization. When choosing a SF value in the presence of RA interference, one needs to take into account that a larger SF increases the burst duration and therefore increases the burst overlap, at a constant burst rate. Nevertheless FIG. 5 shows that higher spreading factors are still beneficial. This result assumes given coarse synchronization, and a sync preamble length (in chips) proportional to the spreading factor. Of course, preamble detection becomes more complex as well, and the required preamble length to achieve coarse synchronization may scale differently depending on the RF channel impairments. It is therefore beneficial to provide for configurable waveform parameters. A configuration with waveform parameters according to Table I is further assumed in this description.

TABLE I

Configurable waveform parameters adopted for occasional and massive logon results

| Parameter | Symbol | Occasional Logon | Massive Logon | Unit |
|---|---|---|---|---|
| info length | K | | 224 | bit |
| coded length | N | | 768 | bit |
| spreading factor | SF | | 5 | — |
| sync preamble | $L_{sy}$ | | 310 | chip |
| transient preamble | $L_{tr}$ | 10 | 200 | chip |
| distributed pilots | $L_{pil}$ | | 890 | chip |
| total burst length | $L_{tot}$ | 5050 | 5240 | chip |
| chip rate | $R_c$ | $10^5$ | $2.10^6$ | chip/s |

The logon signal having a waveform as described embodies the physical layer aspects of one message in a wider logon system that uses signalling messages between NCC and RCST. Now is described an illustrative embodiment of such signalling, as listed in Table II. A signalling direction from the gateway or gateway proxy in the satellite to the terminal is indicated as (NCC⇒RCST) and the opposite direction as (RCST⇒NCC). The suggested transport protocol is shown in Table II by way of example only; DVB protocols are herein reused where convenient. The gateway (proxy) configures one or more logical logon channels, by sending periodically, within the network's forward link signalling channel, a descriptor called (ulogon_broadcast_descriptor). This descriptor preferably identifies each logon channel in the global system uniquely, and the unique channel_id is echoed in the logon message by the terminal performing logon. This allows the gateway (proxy) to link the logon event to the right return link resource. A logon channel can have restricted access, it can be open or closed to different classes of terminals, or it can be open or closed to particular logon methods. For example, a logon channel created for massive gateway-initiated logon may be explicitly closed for terminal-initiated logon; terminals then only access that logon channel when invited in a ulogon_unicast_descriptor. The logon message identifies the terminal and the logon channel contains fields for synchronization support, declares terminal capabilities, reports terminal status and may include an initial capacity request. The general idea is nevertheless that the message is kept very short and only contains the essentials for quickly establishing return link connectivity over traffic channels.

The logon message also contains fields for supporting fast synchronization of the return link transmissions. One of the fields essential for this functionality is a transmit time stamp (preferably the NCR time of synch preamble start). It provides for instantaneous distance ranging and facilitates the immediate start of precision timed slotted traffic flow in step with already active terminals, unaided by, or with reduced reliance on, terminal GPS data or satellite ephemerides data. Likewise, the transmit power field provides for instantaneous measurement of the path gain and enables the immediate start of correctly powered slotted traffic transmissions (safe from a regulatory point of view, and with minimal waste of link margin). The logon system can also instantly resolve the end-to-end frequency translation in the satellite channel in combination with a logon receiver with accurate arrival frequency reporting and adequate frequency acquisition range of, say, 300 kHz peak-to-peak for a Ka-band high-mobility network. Alternatively, a transmit frequency field can be included in the logon message and used for instantaneous measurement of a return path frequency translation, facilitating the immediate start of slotted traffic transmissions at the correct frequency.

TABLE II

Forward and Return link Signalling for logon

| Message | Direction | Transport | Main Purpose or Content |
|---|---|---|---|
| Network Clock Reference | NCC→RCST | e.g., NCR/TS/DVB-S2X | convey time/frequency reference to RCST |
| ulogon_broadcast_descriptor | NCC→RCST | proprietary descriptor sent periodically, e.g., TIM-B:DSM-CC/TS/DVB-S2X | configuring 1 or more ulogon channels: RF frequency, bandwidth, waveform parameters, channel access restrictions, common contention control |
| ulogon_unicast_descriptor | NCC→RCST | proprietary descriptor sent as needed, e.g, TIM-U:DSM-CC/TS/DVB-S2X | request and possibly customize single ulogon_message from designated RCST |
| ulogon_message | NCC←RCST | extendable syntax 1 PDU per burst waveform of the invention | identify terminal, identify ulogon channel, transmit time and transmit level, terminal capability and status information, (optional) initial capacity request |

The inclusion of the transmit parameter fields is also useful when a logon signal transmit parameter already known in the gateway is overruled by the mobile terminal platform. For example, a mobile terminal might, in accordance with regulations, briefly reduce its transmit power density when it determines that the antenna pointing precision is briefly degraded. In another example of an overruled logon transmit parameter, the extreme Doppler frequency translation of a satellite link is higher than the frequency acquisition range of the logon receiver; in that case the terminal may apply possibly partial Doppler pre-correction to the logon burst and signal the applied frequency correction amount (or the corrected transmit frequency value) in a transmit frequency field in the logon message, in order to preserve the ability to precisely characterize the frequency translation in the channel. By these examples it is clear that a transmit parameter field need not always represent the full value of the transmit parameter, in some cases it is sufficient to provide only a delta value with respect to a preset or earlier signalled value. This is obvious to the person skilled in the art of satellite systems.

In the preferred embodiment illustrated in FIG. 3 and Table II, the transmit time stamp contains a network clock reference time stamp (NCR). In DVB-RCS2 a common network clock reference is distributed from the gateway or gateway proxy to each terminal by means of time stamps conveyed by NCR packets in the forward link signalling channel. These time stamps in the forward link refer to start-of-frame times related to the frame structure of the forward link signal. The NCR time stamps inserted in the logon burst signal according to the present invention however relate to a transmit time of the logon burst signal in the return link (for example the transmit time of a particular preamble symbol). It will be clear to a person skilled in satellite network synchronization that there are several available methods for deriving network clock reference values corresponding to a time not coinciding with a forward link start-of-frame instant.

Characterizing translations in a satellite return path finds applications other than fast coordination of return link transmissions. For example, measuring path delays between a satellite and terminals with known positions would allow to compute the satellite position by triangulation.

Figure 6:
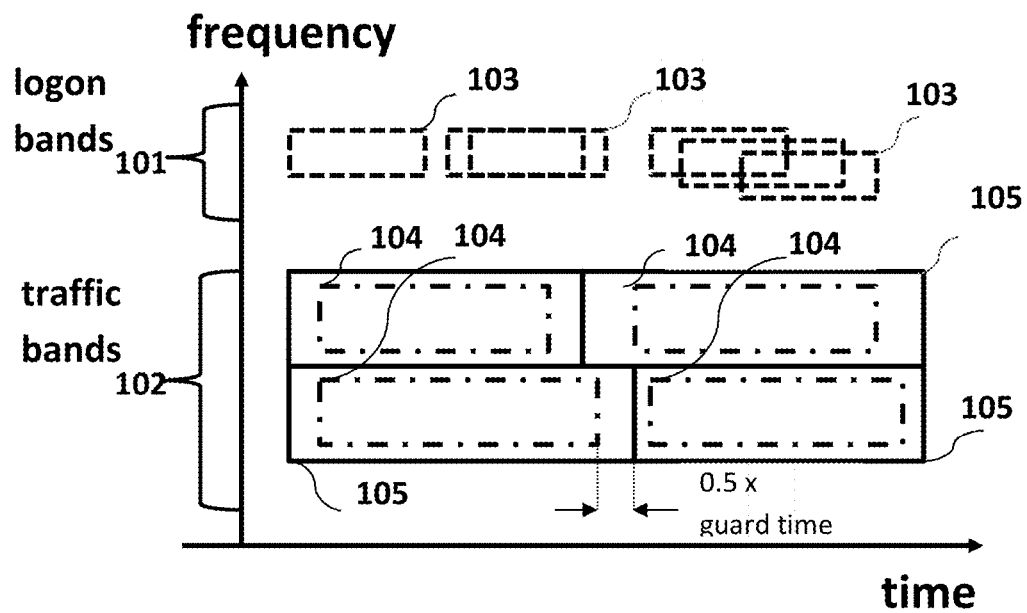
FIG. 6 illustrates an embodiment of a method of allocating frequency resources for non-slotted return link logon transmissions and slotted return link non-logon transmissions in a satellite access network or subnetwork.

In FIG. 6 the organization of a return link in a satellite communication system is illustrated. The return link frequency resources comprise a non-slotted shared frequency resource 101 for logon transmissions 103 and a slotted shared frequency resource 102 for non-logon transmissions 104 (the latter resource being disjunct from the former). The non-logon transmissions 104 are coordinated to fall in corresponding timeslots 105. The timeslot duration exceeds the non-logon burst duration by a guard time. This arrangement allows for an unexpected logon system performance realizable in a non-slotted logon frequency resource, demonstrated hereinafter, to be exploited for the immediate coordination of subsequent non-logon (mostly traffic) signals in a slotted frequency resource. For the bulk of transmissions (traffic) one can thus resort to familiar receive algorithms with low computational effort.

In some possible ways of organizing the return link in a satellite communication system the above described logon waveform is applied. However, it is to be noted that the return link organization can also be used with other types of logon signal. In other words, there is no strict need for a particular logon waveform when implementing the return link organization as described herein. The return link is advantageously so organized that the slotted resource is accessed after an initial synchronization performed using the non-slotted logon transmissions. Coordination in time is achieved by modifying the transmit time of at least the first non-logon signal after successful reception of a logon signal in a receiver, based on the measured arrival time of the successful logon signal in the logon receiver. As an example, a packet is sent to the terminal instructing the terminal to send said first non-logon signal at a given value of the network clock reference reconstructed in the terminal, where said value is obtained by first retrieving a logon transmit time by inspecting a transmit time field comprised in the logon message, subtracting this logon transmit time from the measured logon arrival time and adding the desired arrival time of the non-logon signal. This procedure aligns non-logon transmissions at the gateway or gateway proxy and therefore also at the satellite RF input. In the case of fast moving terminals or fast moving satellite the successfully received logon signal and the first non-logon signal may experience a different propagation delay from terminal to satellite; in that case an additional correction may be applied in the gateway and/or terminal to said instructed transmit time, based on side information related to said fast movement available in the terminal or the gateway. The time coordination between non-logon signals can subsequently be extended well beyond the logon time by observing the arrival time of non-logon signals and sending correction messages or corrected non-logon burst transmit times when the arrival times deviate from planned arrival times, as is done in DVB-RCS systems.

Frequency resources in nominally orthogonal polarizations are considered disjunct even when at same RF frequency. Likewise, frequency resources in non-overlapping beams are considered disjunct even when at same RF frequency. In an embodiment, the resource sharing could be limited to sharing to terminals seeking attachment to same network or subnetwork. In another embodiment, networks or subnetworks use different resources for return link traffic but share a same logon frequency resource. In an embodiment, different networks or subnetworks use a common wide (and presumably low-gain) control beam for logon, while using (advantageously high-gain) traffic beams distinct from the control beam used for logon.

Figure 7:
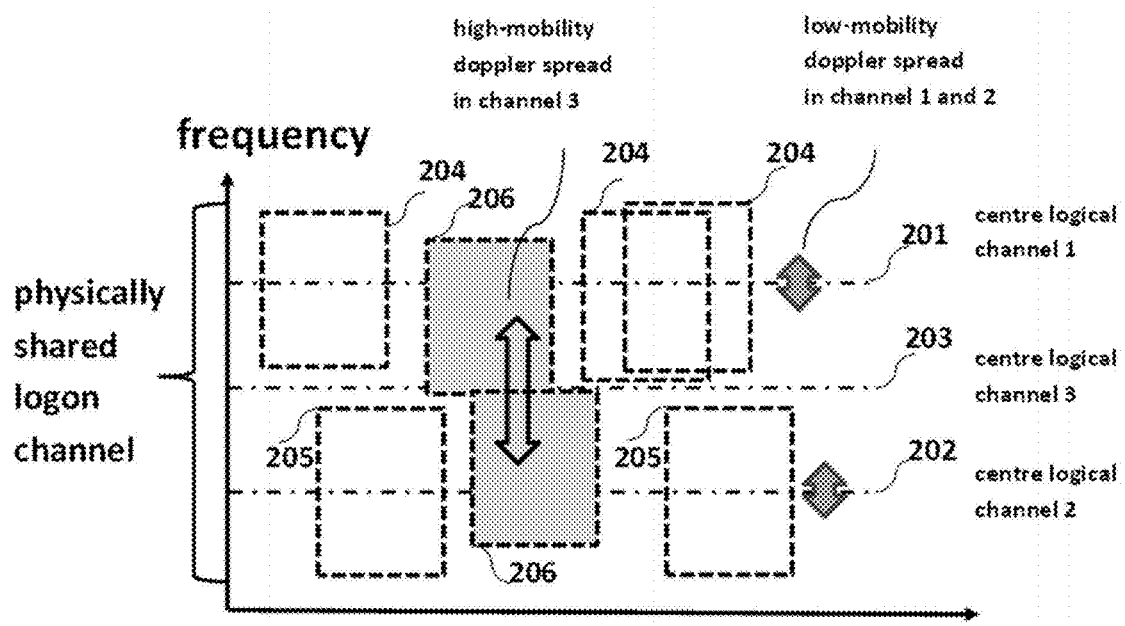
FIG. 7 illustrates a possible procedure for gateway-initiated or terminal-initiated logon where the RA interference is reduced for a given physical logon channel bandwidth shared by high-mobility and low-mobility or fixed terminals.

FIG. 7 illustrates an embodiment where transmissions from a population of low-mobility (e.g., fixed, nomadic, maritime) terminals and high-mobility terminals (e.g., aeronautical) partially share a common logon frequency resource. The nominal centre frequencies for logon signals are separated. The low-mobility terminals with low uplink Doppler spread use the nominal uplink frequencies 201 and 202. The high-mobility terminals with high uplink Doppler spread use the nominal uplink frequencies 203. It is seen that the RA interference is reduced, in particular by the frequency separation between bursts 204 and 205, sent by the low-mobility terminals. Since the Doppler range for aeronautical terminals is typically of the same order as the bandwidth of logon burst signals for occasional logon, the saving in overall frequency resources dedicated to logon can be substantial.

Occasional logon corresponds to the "normal" network state. Logon events from different terminals are essentially uncorrelated and occur mainly when terminals awake from idle-logged-off state or reconnect after losing line-of-sight. The key objective is to keep the allocated bandwidth Bo needed for low-latency occasional logon small compared to the bandwidth dedicated to traffic. One has $B_o=(1+\alpha) \cdot Rc+B_u$ where $R_c$ is the logon chip rate, a a roll-off factor and Bu the peak-to-peak uplink frequency uncertainty due to terminal motion and other factors. When $R_c<B_u$ or $R_c<<$traffic bandwidth, further reduction in $R_c$ does not help much, so $R_c<100$ kChip/s is not investigated. The logon capacity is about $R_c \cdot \lambda/L_{tot} > 40$ logon/sec, where $\lambda \approx 2$ is taken to be the Aloha channel load where most logon attempts are successful for a typical terminal population. A single 100 kChip/s logon channel thus still supports a network of over 2000 terminals performing 1 logon/minute on average.

Figure 8:
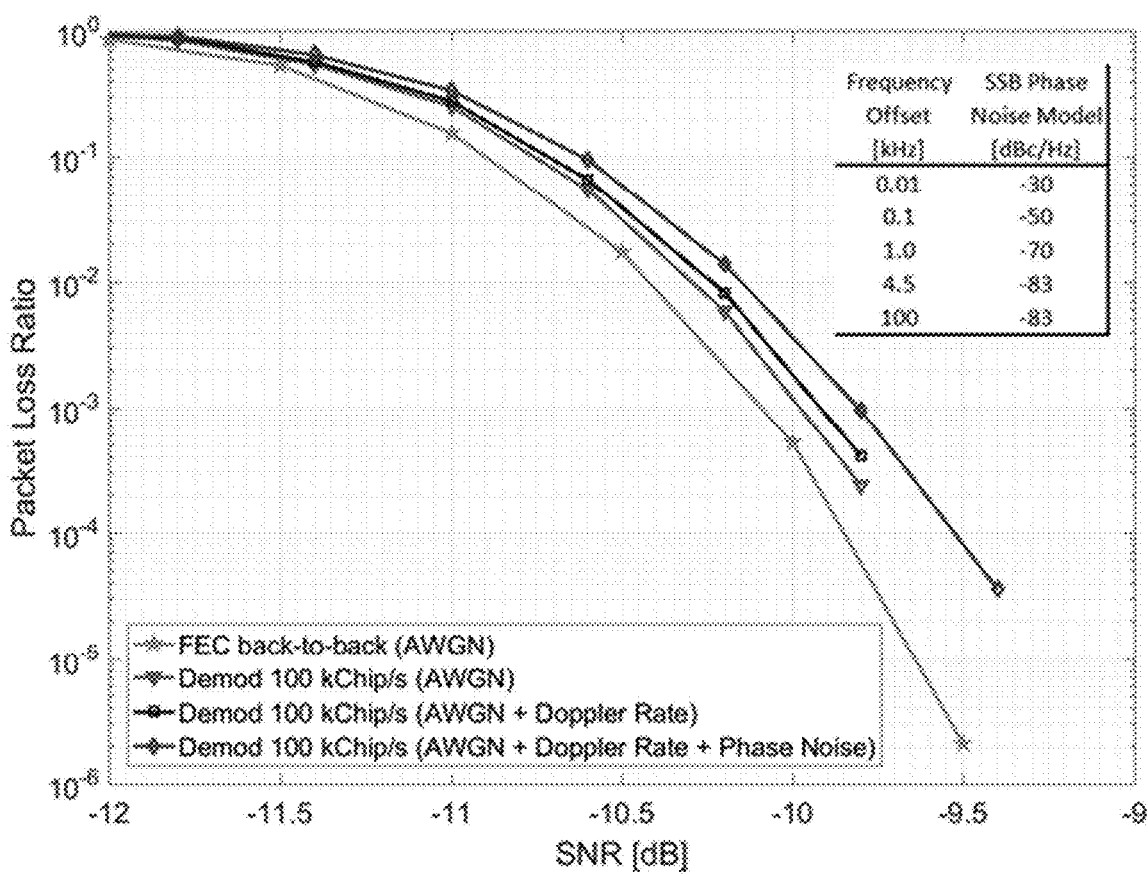
FIG. 8 illustrates the resilience of a 100 kChip/s logon channel to Doppler rate and phase noise. The Doppler rate corresponds to 15 m/s$^2$ acceleration in $K_u$ band. Phase noise is as detailed in inset, compared to an IESS-308 mask.

For the occasional logon regime, focus is therefore on the challenge of VLSNR burst reception down to 100 kChip/s signalling rate in the presence of severe Doppler and phase noise. Simulation results are shown in FIG. 8.

The terminal-initiated method for occasional logon is further promoted. In a (demoted) gateway-initiated approach one keeps track of the set of terminals that potentially need to connect to a particular gateway, invite them periodically to send a logon burst and listen for responses with non-null capacity request. Such polling of $N_u=N_{ur}+N_{ui}$ unreachable (blocked or powered down) or uninterested (idle) terminals in a revisit cycle of duration $T_R$ wastes total bandwidth $B_w$ due to excess forward and return link signalling given by $T_R B_w \approx (8 N_u L_{TIMU}/\eta + N_{ui} L_{tot}/\lambda) (1+\alpha)$ where $L_{TIMU} \approx 45$ is the length of a logon_unicast_descriptor in bytes, $\eta \approx 0.3$ is the efficiency of the forward link signalling modcod, $L_{tot}$ is the logon burst length in chips, $\lambda \approx 2$ is the logon channel Aloha load and $\alpha \approx 0.05$ is a common roll-off factor. In large networks requiring low response time $T_R$ clearly the waste $B_W$ could grow to a significant fraction of total service bandwidth.

Both the gateway-initiated and the terminal-initiated approach are next proposed. The following assumptions are thereby made. Note that the above described logon waveform may be applied in some possible ways of organizing the return link in a satellite communication system. However, the return link organization can also be used with other types of logon signal. In other words, there is no strict need for any particular logon waveform when implementing the return link organization as described herein.

Waveform parameters are selected per Table I. It will be shown that very fast network recovery is possible with a massive logon channel bandwidth $R_c$ that is still small compared to the traffic bandwidth in the large networks that use massive logon. Consequently, terminals can ramp up to nearly full traffic capacity "in one go" before switching back to occasional logon mode.

$N_{pa}=5000$ previously active terminals to be reconnected

The round-trip-time (RTT) is uniformly distributed in a range 0.49-0.51 sec, so any feedback mechanism with up to GEO delay in the loop is validated In the few seconds needed for massive logon the RTT for a given terminal hardly changes in comparison to the logon burst duration, so retransmissions can safely be modelled assuming identical RTT signal power is specified with respect to link thermal noise power (excluding interference power from colliding bursts) and either of two signal-to-noise ratio (SNR) distributions is assumed in FIG. 9. Cases A and B are selected to be challenging and very different: case A is bimodal with large power imbalance, whereas case B has much less power imbalance, but terminals hug the lower SNR limit for the waveform.

Although the massive logon regime is simulated until all $N_{pa}$ terminals are logged on, in practice one switches back to the occasional logon channel as soon as $\gamma N_{pa}$ terminals are logged on ($\gamma \approx 0.95$). This point is marked on completion curves; behaviour beyond it is immaterial.

in the simulation delays is not included the initial forward link acquisition latency as it is highly implementation specific and does not affect the dynamics of massive logon.

Gateway-Initiated Approach

Figure 10:
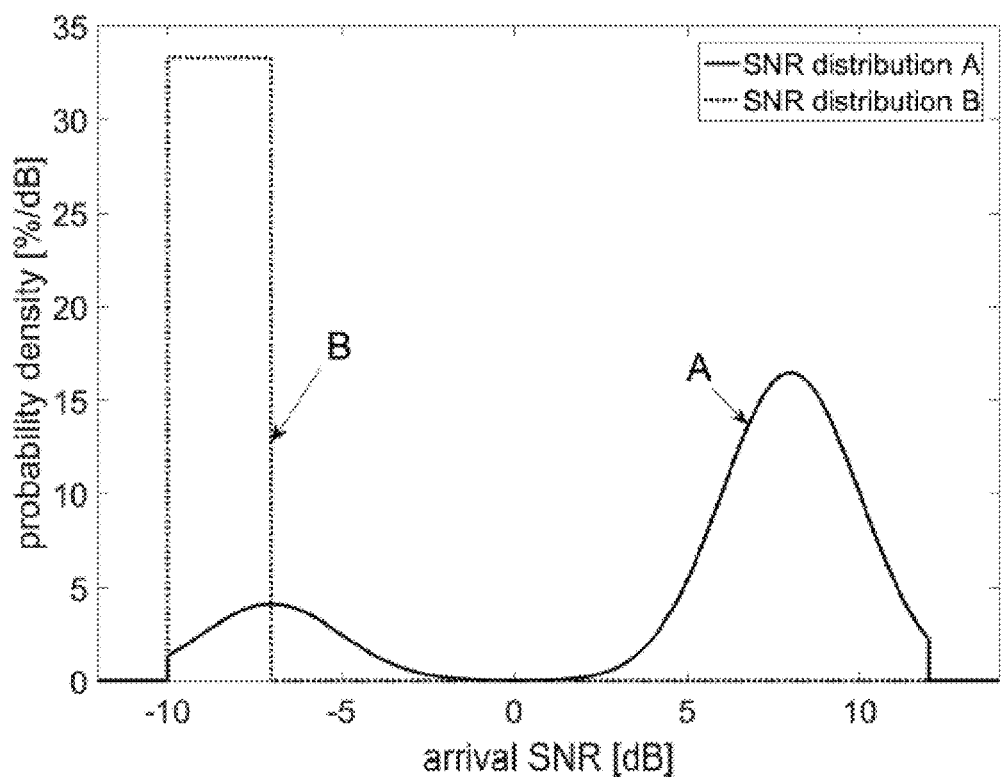
FIG. 10 illustrates a distribution of arrival SNR assumed for massive logon regime results. SNR stands for each burst's signal to thermal noise ratio and, hence, excludes RA interference.
Figure 11:
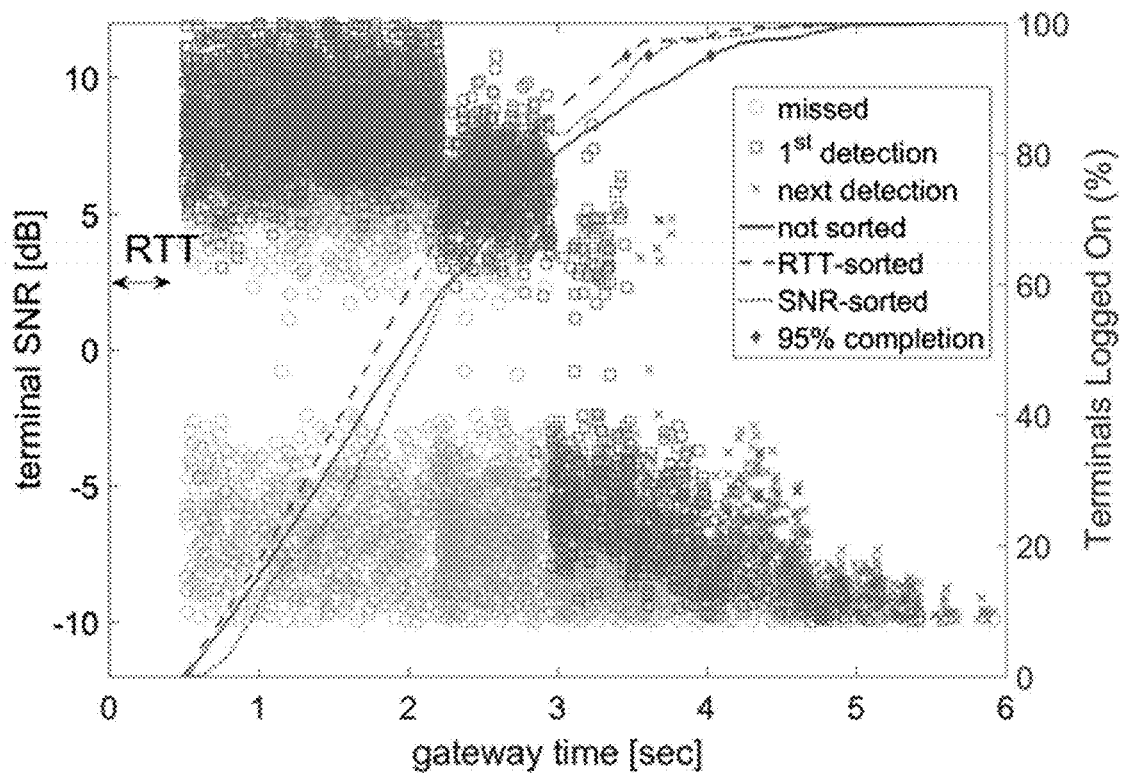
FIG. 11 illustrates a gateway-timed massive re-logon of $N_{pa}$=5000 previously active terminals. The logon channel is 2MChip/s. The level distribution is as in FIG. 10(A). The Round-trip-time (RTT) is uniform over the range [0.49,0.51] sec. The fraction of terminals logged on is shown versus gateway time for polling in, respectively, non-sorted, RTT-sorted, SNR-sorted order. Scatter plot of burst SNR versus gateway arrival time (missed and detected bursts, non-sorted polling only).

In the proposed gateway-initiated approach the gateway invites each of $N_{pa}$ previously active terminals to logon, for example according to a stochastic gradient algorithm corresponding in essence to FIG. 9. For each logon invite the next scheduled transmit time is advanced by a fraction $1/\Lambda$ of the burst duration. A can be interpreted as the current RA channel load. When a logon burst is successfully detected, A is increased and the polling rate is speeded up. When a terminal response times out, A is decreased and the polling rate is slowed down. This is controlled by parameters $\Lambda_{ini}$, $\Lambda_{min}$, $\Lambda_{max}$, $\delta_1$, $\delta_0$. Values 6.0, 9.0, 0.7, 0.002, 0.0025 are suitable for any distribution of terminal level over $N_{pa}=5000$ terminals. The roughly equal values of $\delta_0$ and $\delta_1$ drive the number of misses (timeouts) and successes to become almost equal, so for each successful logon only about two bursts are sent, a number that interestingly could not be lower when using CRDSA, where each burst is replicated to start with. In FIG. 11 the behaviour is illustrated for the terminal level distribution of FIG. 10(A). Subsequent passes over the terminal population tend to first logon the terminals with a high SNR. Logon success rates up to some 2000 RCST/sec are seen, that is 5 per burst duration, falling off after only the lowest-SNR terminals remain. The order in which the previously active terminals are scanned can be determined by any knowledge that exists in the gateway regarding the terminals that were recently lost. Since before the catastrophe the arrival time of traffic bursts was kept in step with a slotted frame structure, it is reasonable to assume that the RTT of each terminal to within a small fraction of the logon burst duration is still known. It turns out that, for a uniform distribution of the RTT, the network recovery speeds up significantly when terminals are invited in the order of their RTT value. Likewise, pre-ordering terminals by the predicted logon SNR can be shown to have an impact.

Terminal-Initiated Approach

Figure 12:
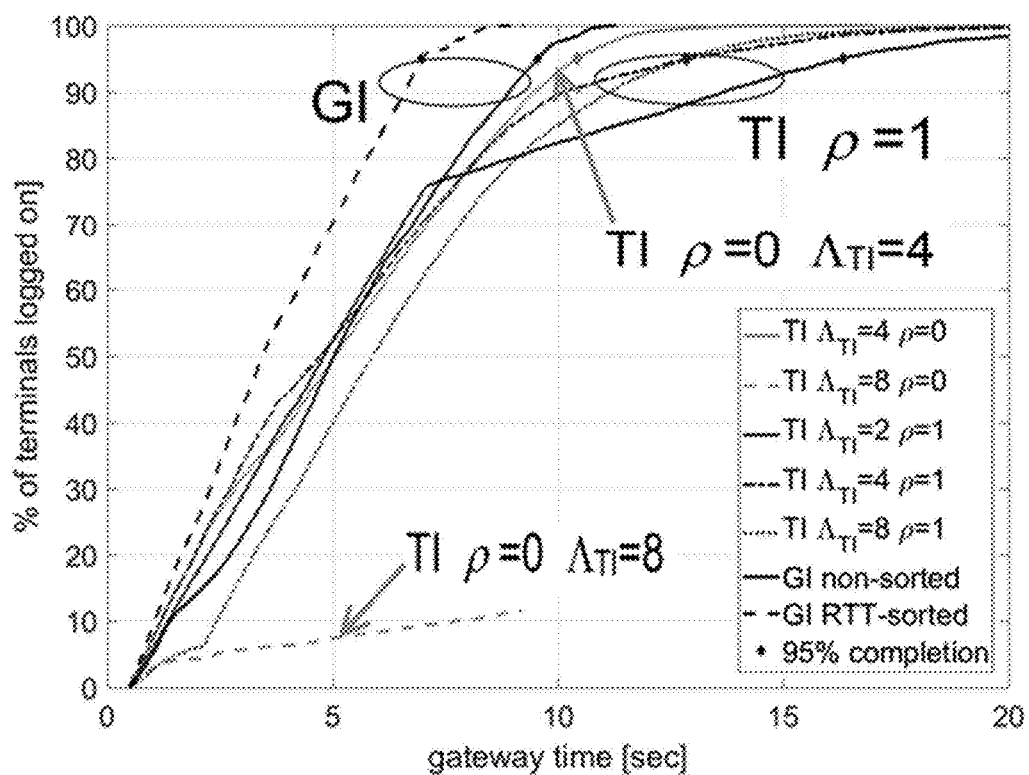
FIG. 12 illustrates a comparison of Gateway-Initiated (GI) and Terminal-Initiated (TI) massive re-logon of $N_{pa}$=5000 terminals. Logon channel is 2MChip/s. The level distribution is that of FIG. 10(B). Round-trip-time (RTT) uniform over [0.49,0.51] sec. Fraction of terminals logged on versus gateway time for different parameters of the algorithm of FIG. 13.

For terminal-initiated massive logon, as for the gateway-initiated approach, the gateway first configures the massive logon channel, but opens it for terminal-initiated access. Each terminal then independently runs the simple algorithm of FIG. 13 to schedule subsequent random transmit times (with a slight abuse of notation, since the transmission of a logon burst with first synchronisation preamble symbol aligned with time $t_{TX}$ is initiated a short time before the terminal's local NCR copy assumes a value $t_{TX}$). The results shown here were generated for $T_{min,rtry}$=0.5 sec and $T_{max,acq}$=$T_{max,rtry}$−$N_{ap}$·$L_{tot}$/$R_c$/$\Lambda_{TI}$ where $\Lambda_{TI}$ is the dimensionless normalized initial RA channel load. The parameter Q governs a polynomial increase in the random retrial interval (when Q=0 there is no increase, but the RA load may still fall off due to terminals logging on). One can compare to the quadratic back-off rule in DVB-RCS2, which would correspond to Q=2. For the power distribution (A) in FIG. 10 gateway-initiated a quite good performance is actually observed (not illustrated here) with Q=0 but an accidental matching to SNR distribution (A) was suspected. For SNR distribution (B) results are shown in FIG. 12. Both fast and slow network recovery can be produced for Q=0, depending on the value of A. However, it seems not straightforward to properly set A based on knowledge available in the gateway. For Q=1, reasonable insensitivity to the parameter choice can be seen, but the best results for Q=0 cannot be equalled. No benefit was found in the value Q=2 of the DVB-RCS2 standard. In comparison the gateway-initiated approach outperforms the best terminal-initiated results without tweaking any parameters. Furthermore, again a consistent significant improvement is seen from polling in RTT-order.

The described waveform for logon signals can advantageously be used with geostationary transparent satellite payloads. It is however very well suited also for deployment with non-GEO satellites, including Medium Earth Orbit (MEO), Low Earth Orbit (LEO) and Highly Elliptical Orbit (HEO) satellites, especially due to its proven Doppler resilience.

It is to be noted that the disclosed approach is compatible with satellite segments using beam hopping (BH) in the return link. In particular the usage of a non-slotted frequency resource for logon and a slotted frequency resource for subsequent transmissions remains valid. Terminals can still share the logon frequency resource provided by a same BH illumination without subdividing that resource in distinct logon slots, with the obvious restriction that at least some BH illumination intervals exceed the duration of a logon signal in order to be able to relay at least some logon transmissions across the beam-hopped satellite segment. Likewise, the traffic transmissions accessing the frequency resource provided by a BH illumination can still be subdivided into traffic time slots, the immediate initial synchronization to which is provided using the information retrieved from a single successful logon transmission. In general logon transmissions will only be allowed after successfully receiving the forward link and NCR and return link beam hopping time plan contained therein (where the forward link space segment itself may be either beam-hopped or not). The described gateway-timed transmission of logon signals therefore can be used to at least partially synchronize logon transmissions to the illuminations announced in the BH time plan.

In the context of GEO, MEO or LEO satellites with flexible beam-forming the VLSNR waveform has also been earmarked for roles beyond logon, such as requesting traffic beam coverage.

The logon technique of the present invention also applies to 5GNR Non-Terrestrial Networks (NTN) links. The current 5GNR standard (3GPP release 17 and before) defines logon occasions as reserved time and frequency segments in an OFDM grid. In 5GNR, the link delay is estimated based on a comparison of the RACH reception time of the sequence with the start of the allocated slot. In contrast, in the present invention, the link delay is estimated by comparing the RACH reception time with the transmission timestamp transferred as part of the payload of the logon waveform. Based on this invention a novel 5GNR logon mechanism is proposed where a part of the frequency resources is, in a preferred embodiment, permanently reserved for logon and can be used in a non-slotted manner. The ambiguity on the transmission time of a received waveform can be resolved based on the payload data.

In the current 5GNR standard RACH resources are very configurable, but typically few slots per N (1 to 16) frames are reserved for logon (RACH). FIG. 14 shows some example allocations for the slotted RACH occasions (RO) for terrestrial 5GNR links. The slotted RACH occasions constitute a slotted logon frequency resource. A frequency domain RO consumes a number of resource blocks (RB), for example 6 to 24 resource blocks, with a resource block being composed of 12 OFDM subcarriers, and multiple ROs can be adjacent in frequencies (3 shown in FIG. 14). A number of resource blocks is a defined set of resources in time and frequency. Each RACH slot can also be composed of multiple consecutive ROs in time (3 shown in FIG. 14).

Figure 15:
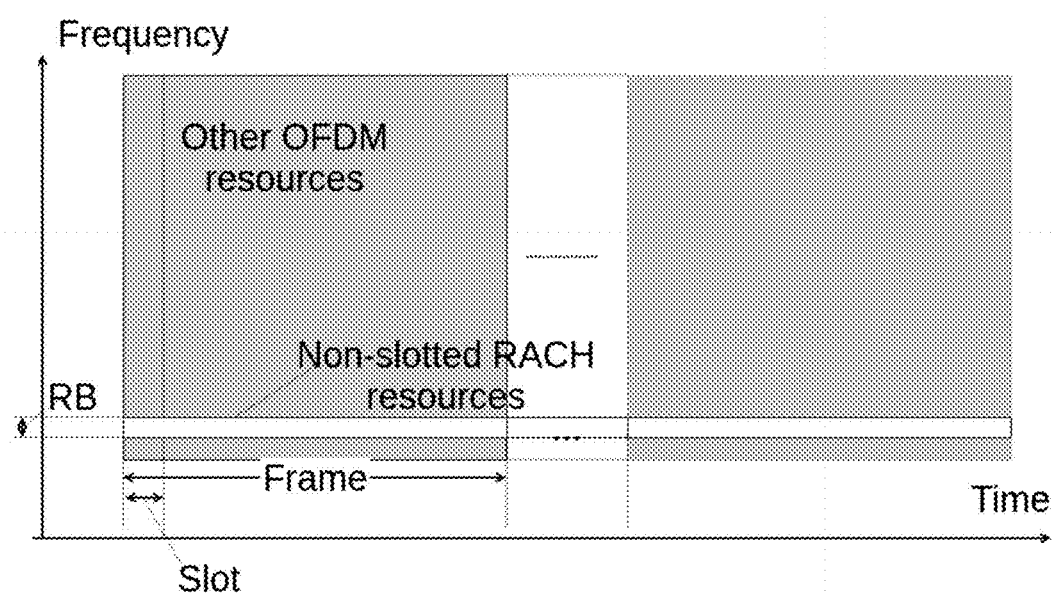
FIG. 15 illustrates an organisation of RACH resources allowing non-slotted logon in 5GNR.

FIG. 15 shows an advantageous non-slotted logon resource allocation for 5GNR NTN as disclosed in this invention. The RACH resources should be reorganised such that these consume one or more resource blocks in frequency for, in a preferred embodiment, an infinitely extended time window (or, in another embodiment, at least for a time window that is long compared to a 5GNR subframe). The reserved RACH resources can be placed anywhere in the return bandwidth. On terrestrial links, spreading the logon waveform more in frequency than in time was beneficial as it minimizes delay and improves the resilience to multipath. However, for NTN satellite links the delay is less critical as the round-trip times are larger and there is typically less multipath fading.

Current 5GNR standardisation (e.g., 3GPP release 16-17) does not include any payload information in the RACH waveform. Therefore, a person knowledgeable of the field of wireless communication standards, will readily realize that implementing the solution presented in the invention requires, depending on the embodiment, a combination of some extensions to the current 5GNR standard.

Firstly, the OFDM mapping of uplink channels must, in a preferred embodiment, allow reservation of resources for UE logon transmissions that are, preferably, non-slotted and, in general, extended in time. Secondly, the reserved logon resources shall, in a preferred embodiment, include frequency guard bands adapted to cope with initial arrival frequency uncertainty of the UE logon signal in the NTN channel and to avoid excessive interference of the logon waveform with the other 5GNR resources and vice versa. Thirdly, the non-slotted logon will also require changes in the 5GNR RACH waveform. The waveform shall now comprise both a synchronisation sequence for RACH detection and an appended payload encoding the terminal identification and some transmit time information like the transmit system frame number (SFN). In order to reuse as much as possible current 5GNR functionality, the waveform preamble is advantageously composed of existing 5GNR Zad-off-Chu sequences instead of the PN sequence based preamble illustrated in FIG. 3. Advantageously, the polar code defined for the current physical Downlink Control Channel (PDCCH) and Physical Uplink Control Channels (PUCCH) is re-used, instead of the PCCC code depicted in FIG. 3. Said polar code can have up to 140 payload bits, which is adequate for encoding of the terminal ID, the transmit time, the transmit level and the transmit frequency information. Similar to the waveform defined above VLSNR performance can be further improved by repetition code and spreading the distribution of demodulation reference symbols (RS) can be similar as proposed for the Physical Uplink Control Channel (PUCCH) formats but reorganised for smaller frequency allocations and longer time allocations.

5GNR Release 16 alternatively foresees a two-step RACH where the RACH sequence can be combined with a PUSCH transmission containing terminal identification data. However, this remains a slotted approach and does not allow to cope with large timing uncertainties as required for 5GNR NTN links. The presented invention would be beneficial for 5GNR NTN for non-slotted logon.

The invention is not limited to non-slotted logon. In another embodiment, the identified frequency resources for logon can be timeshared between data traffic and logon. For instance, logon occasions could be reserved every second during 100 milliseconds. The non-logon signal (i.e., data traffic) transmissions occur via a further slotted logon frequency resource disjunct from the shared slotted logon frequency resource used for the logon burst signal transmission. The shared slotted logon frequency resource may be a reserved set of resources in an OFDM grid. In some embodiments the shared slotted logon frequency resource is a random access channel, PRACH, of a 5GNR non-terrestrial network. In other words, embodiments with slotted logon may occur with similar characteristics as non-slotted logon solutions. It should therefore be clear to the person skilled in this technical field that the invention also applies to those slotted logon alternatives.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for a logon procedure in a 5G New Radio (5GNR) non-terrestrial network comprising: at least one user equipment, a satellite and either a gNodeB base station or a gNodeB base station on-board the satellite, the method comprising:
transmitting a logon burst signal from a user equipment to said gNodeB base station or gNodeB base station on-board the satellite,
wherein said logon burst signal comprises one or more transmit parameter fields, each of the one or more transmit parameter fields corresponding to a signal transmit time or a signal transmit level or a signal transmit frequency of said logon burst signal in said user equipment.

2. The method for the logon procedure as in claim 1, further comprising: receiving said logon burst signal in said gNodeB base station or said gNodeB base station on-board the satellite and retrieving said one or more transmit parameter fields, the method comprising:
if a transmit parameter field of said one or more transmit parameter fields comprises a network clock reference time stamp value corresponding to a transmit time of said logon burst signal, measuring an arrival time of said logon burst signal and computing a path delay based on said measured arrival time and said network clock reference time stamp value,
if a transmit parameter field of said one or more transmit parameter fields comprises a transmit level value corresponding to a transmit level of said logon burst signal, measuring an arrival level of said logon burst signal and computing a path gain based on said arrival level and said transmit level value,
if a transmit parameter field of said one or more transmit parameter fields comprises a transmit frequency value corresponding to a transmit frequency of said logon burst signal, measuring an arrival frequency of said logon burst signal and computing a path frequency translation based on said arrival frequency and said transmit frequency value.

3. The method for the logon procedure as in claim 2, comprising: instructing said user equipment to send at least a first subsequent signal, wherein a transmit time or a transmit level or a transmit frequency of said first subsequent signal is modified based on said computed path delay or path gain or path frequency, respectively.

4. The method for the logon procedure as in claim 1, wherein said logon procedure is gNodeB base station initiated and comprises a logon sequence which consecutively instructs, at a given sequencing pace, each individual member of a predetermined set of user equipments to send a logon burst signal in a logon channel shared by said predetermined set of user equipments.

5. The method for the logon procedure as in claim 4, wherein the order in which each user equipment of said predetermined set is instructed in said logon procedure is determined based on information collected in said gNodeB base station or said gNodeB base station on-board the satellite.

6. The method for the logon procedure as in claim 5, wherein said order is determined based on a round-trip time or on a logon signal-to-noise ratio.

7. The method for the logon procedure as in claim 4, wherein said sequencing pace is modified based on a ratio of successful reception versus unsuccessful reception of instructions of said logon sequence.

8. The method for the logon procedure as in claim 7, wherein said ratio of successful reception versus unsuccessful reception of instructions is substantially equal to 1.

9. The method for the logon procedure as in claim 1, wherein said logon burst signal is transmitted via a slotted logon frequency resource shared among said one or more user equipments.

10. The method for the logon procedure as in claim 9, further comprising: transmitting non-logon signal transmissions via a further slotted logon frequency resource, said further slotted logon frequency resource being disjunct from said shared slotted logon frequency resource.

11. The method for the logon procedure as in claim 9, wherein the shared slotted logon frequency resource is a reserved set of resources in an Orthogonal Frequency Division Multiplexing (OFDM) grid.

12. The method for the logon procedure as in claim 9, wherein the shared slotted logon frequency resource is a random access channel, Physical Random Access Channel (PRACH), of a 5GNR non-terrestrial network.

13. The method for the logon procedure as in claim 1, wherein said logon burst signal is transmitted via a non-slotted logon frequency resource shared among said one or more user equipments.

14. The method for the logon procedure as in claim 13, further comprising: transmitting non-logon signal transmissions via a slotted logon frequency resource, said slotted logon frequency resource being disjunct from said shared non-slotted logon frequency resource.

15. The method for the logon procedure as in claim 13, wherein the non-slotted logon frequency resource is a reserved set of resources in an OFDM grid.

16. The method for the logon procedure as in claim 15, wherein the reserved set of resources comprises one or more resource blocks.

17. The method for the logon procedure as in claim 13, wherein the non-slotted logon frequency resource is a random access channel, PRACH, of a 5GNR non-terrestrial network.

18. The method for the logon procedure as in claim 1, wherein one of said transmit parameter fields corresponding to a signal transmit time is a transmit system frame number, SFN.

19. The method for the logon procedure as in claim 1, wherein the logon burst signal comprises a Zadoff-Chu sequence and a logon payload.

20. The method for the logon procedure as in claim 19, wherein the logon payload is encoded using polar codes as standardised in 5GNR.

* * * * *